(12) United States Patent
Cornelius et al.

(10) Patent No.: US 6,357,960 B1
(45) Date of Patent: Mar. 19, 2002

(54) NON-PROTRUSIVE EXPANDABLE CLAMPING DEVICE

(75) Inventors: Charles S. Cornelius, Huntsville, AL (US); David A. Gibson, Fayetteville; Bob R. Hurst, Flintville, both of TN (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/770,740

(22) Filed: Jan. 24, 2001

(51) Int. Cl.[7] .................................................. B25G 3/08
(52) U.S. Cl. .................... 403/381; 403/370; 403/374.1; 411/24
(58) Field of Search ....................... 411/24–28; 403/381, 403/370, 373, 374.1, 374.3, 294, 361

(56) References Cited

U.S. PATENT DOCUMENTS

| | | | |
|---|---|---|---|
| 201,378 A | * | 3/1878 | Allen |
| 3,432,214 A | * | 3/1969 | Cashman |
| 4,251,962 A | | 2/1981 | Langenhorst |
| 4,344,258 A | | 8/1982 | Langenhorst |
| 5,263,351 A | * | 11/1993 | Berg |
| 6,089,781 A | * | 7/2000 | Kellberg |

* cited by examiner

Primary Examiner—Flemming Saether
(74) Attorney, Agent, or Firm—Arthur H. Tischer; Freddie M. Bush; Hay Kyung Chang

(57) ABSTRACT

A Non-Protrusive Expandable Clamping Device fastens together two bodies when conventional fastening devices cannot be used because of the unique space constraints and/or the shape of the joining surfaces of the bodies. The expandable clamping device, which has two tenons on opposite sides of its housing, can be slid into the bodies that have corresponding mortises on their joining surfaces to accommodate the tenons. The clamping device connects the bodies in one linear plane using motion in an orthogonal plane. When the clamping process is completed, facilitated by the rotational motion of a threaded bolt within the cavity inside the housing, what results is a joint that is strong in all directions as well as flush and airtight between the surfaces when an appropriate gasket or O-ring is utilized. Such a joint ensures proper alignment of the bodies while providing fixity in six degrees of freedom.

14 Claims, 9 Drawing Sheets

NON-PROTRUSIVE EXPANDABLE CLAMPING DEVICE

DEDICATORY CLAUSE

The invention described herein may be manufactured, used and licensed by or for the Government for governmental purposes without the payment to us of any royalties thereon.

BACKGROUND OF THE INVENTION

This invention relates to devices for fastening together two bodies whose shape as well as the requirement for flatness of the joined surfaces do not allow the use of conventional fastening means like screws, pins and bolts. Such bodies, however, once joined, may be required to have fixity in six degrees of freedom under high operational loads yet maintain proper alignment, flatness and airtight seal of the joined surfaces. The airtightness of the seal may be achieved by the use of an appropriate gasket or O-ring. The requirement for flatness of the joined surfaces renders unusable conventional fastening means, which can protrude outside the joined surfaces. Rather, the flatness of the joint needs to be ensured by distributing the clamping load across a larger area than can be accomplished by the use of conventional fastening devices, which usually concentrate fastening loads at a single, localized area. Further, the space limitations normally occasioned by the shape of the bodies to be joined allow no room for using the tools necessary for attaching the conventional fastening devices. Therefore, a novel fastening device is needed that may be inserted parallel to the joined surfaces rather than perpendicular to them and that does not protrude externally from the joined surfaces but, at the same time, allows easy disassembly and reassembly.

SUMMARY OF THE INVENTION

A Non-Protrusive Expandable Clamping Device (hereinafter referred to as the "clamping device" or "expandable clamping device"), the preferred embodiment of which is shown in FIG. 1, fastens together two bodies when conventional fastening devices cannot be used because of the unique space constraints and/or the shape of the joining surfaces of bodies 50 and 52. The expandable clamping device 100, having two tenons 101 and 103 comprising housing 10, can be slid into the bodies that have corresponding mortises on their joining surfaces to accommodate the tenons. This is illustrated in FIG. 6, which shows an end-view of the clamping device in locked position. The clamping device, when placed internally to the bodies as illustrated, has no portion that protrudes externally of the bodies, while connecting the bodies in one linear plane using motion in an orthogonal plane. When the clamping process is completed, facilitated by the rotational motion of threaded bolt 16 within cavity 30 located inside housing 10, what results is a joint that is strong in all directions and a flush, airtight seal between the surfaces that ensures proper alignment of bodies 50 and 52. The expandable clamping device 100 has the added virtue of easy disassembly and reassembly.

DESCRIPTION OF THE PREFERRED EMBODIMENT

Figure 1:
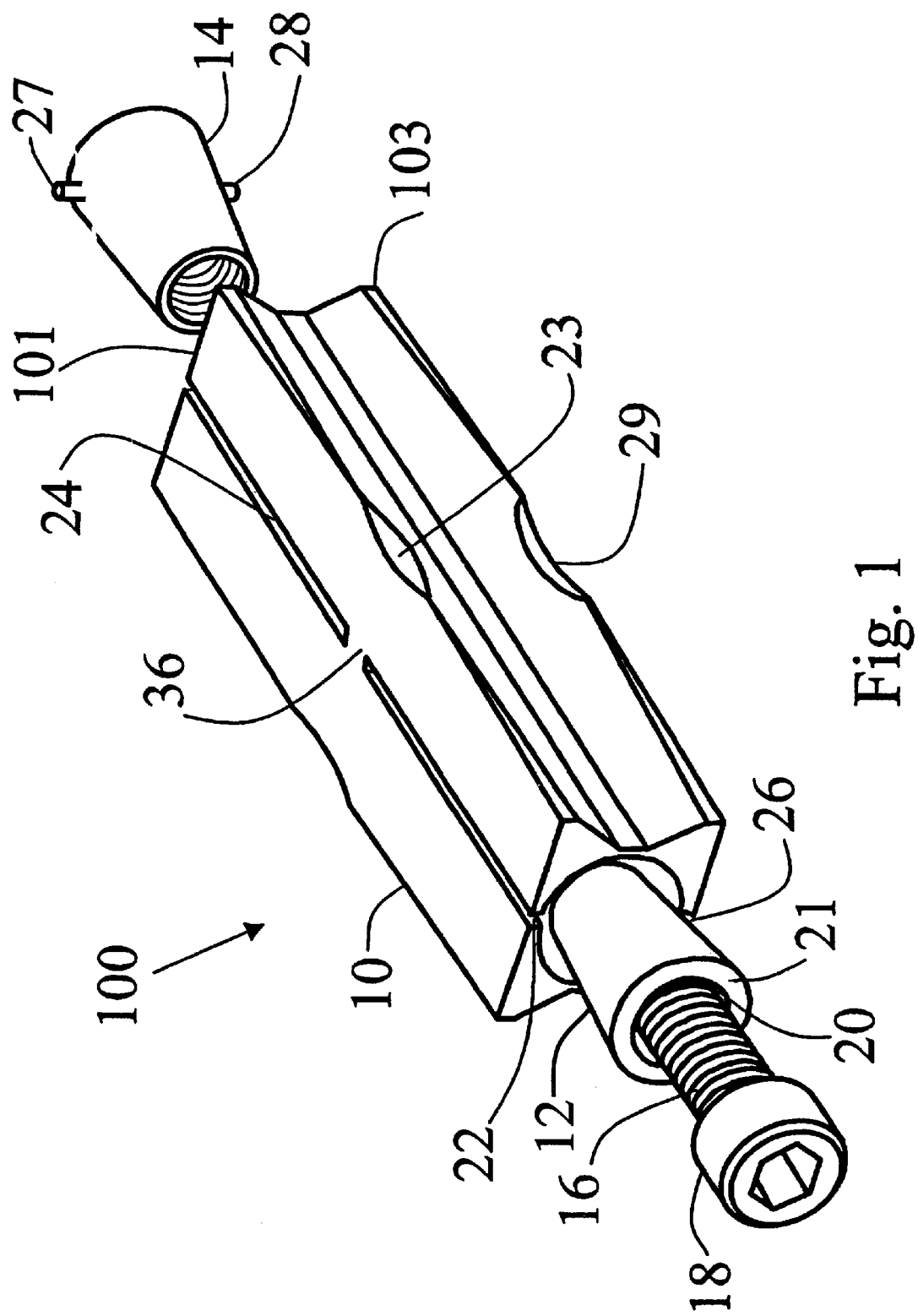
FIG. 1 shows a preferred embodiment of a Non-Protrusive Expandable Clamping Device.
Figure 2:
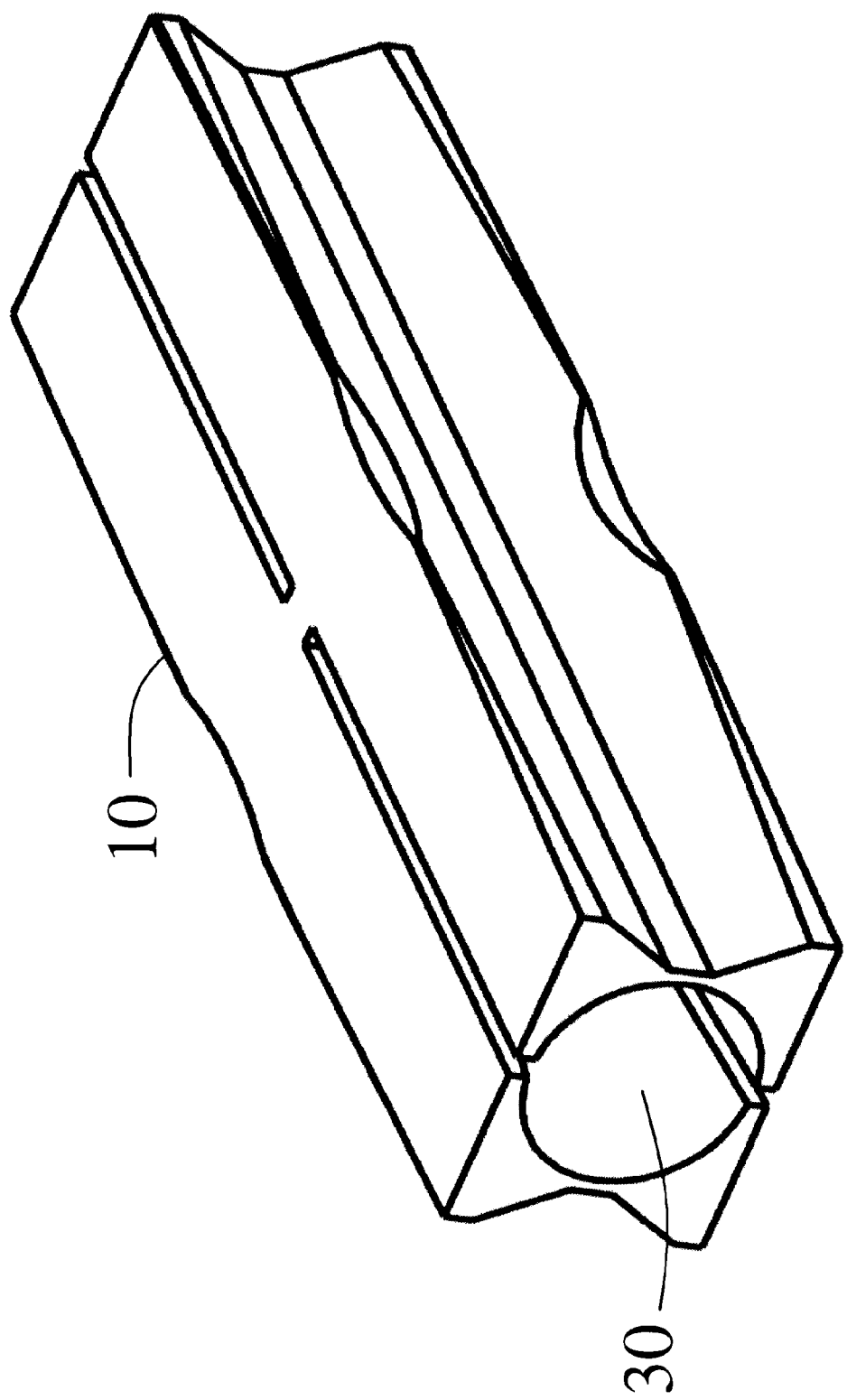
FIG. 2 depicts the housing with the cavity therethrough.

Referring now to the drawing wherein like numbers represent like parts in each of the several figures, FIG. 1 shows the over-all view of a preferred embodiment of Non-Protrusive Expandable Clamping Device 100. The entire device is encased in compact housing 10, which is of integrated, one-piece construction. The housing has longitudinally therethrough cavity 30 (see FIG. 2) of a predetermined configuration and outer edges that are slightly tapered inward from their respective midsections such as 23 and 29 to allow for flaring out of the edges during the clamping process to secure together bodies 50 and 52. To enable the edges to flare out during the clamping, the housing should be made of material whose flexibility allows such movement.

Figure 3:
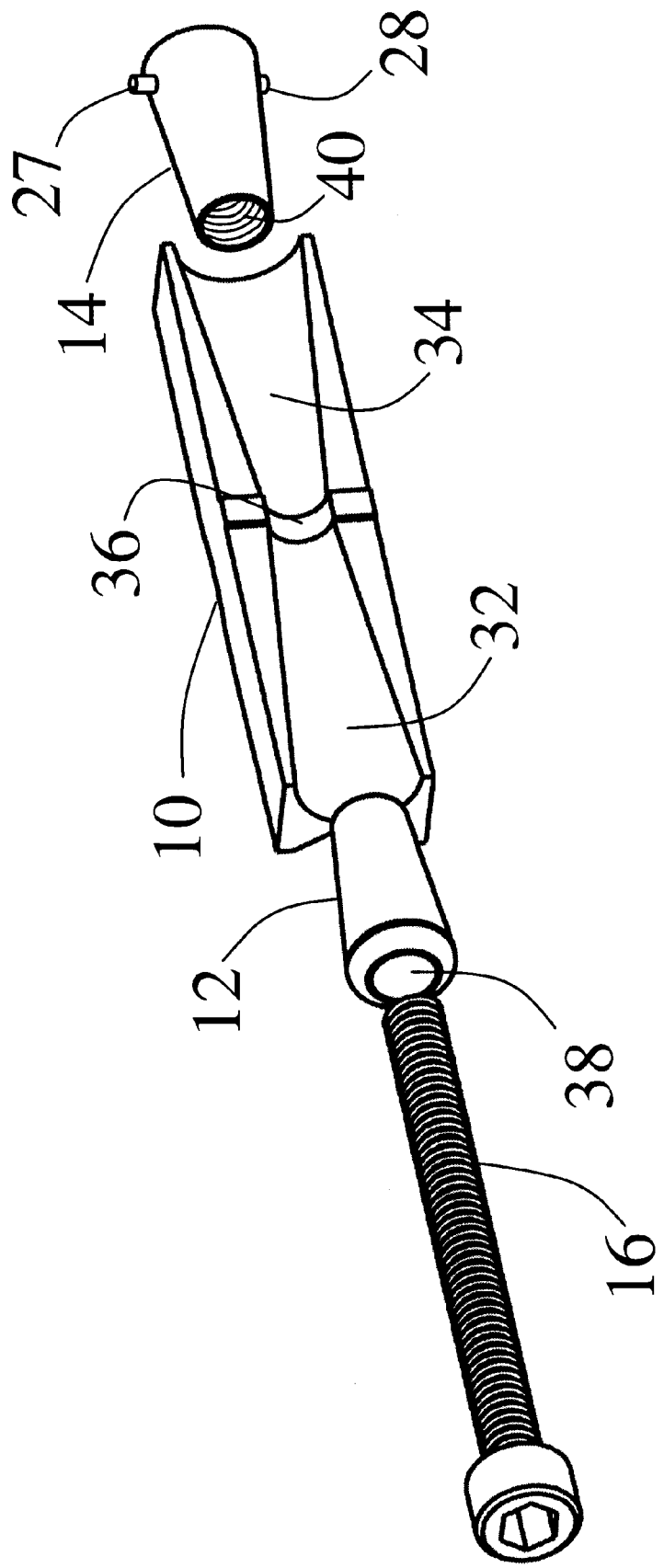
FIG. 3 is a cross-sectional and exploded view of the housing and the components adapted to be fitted into the housing.

As shown in cross-sectional view in FIG. 3, cavity 30 is comprised of two truncated conical segments 32 and 34 which are mirror images of each other with respect to flat center 36 and taper down toward the flat, untapered center. Along the length of these cavity segments are four grooves that open to the exterior of the housing as shown in FIG. 1. The grooves 22, 24, 26 and 25. Grooves 22 and 24 run down the longitudinal middle of first tenon 101 while grooves 26 and 25 run down the longitudinal middle of second tenon 103, the tenons being formed by the external structure of housing 10. It is noted that fourth groove 25 is unseen but is necessarily and logically implied in FIG. 1 and is positioned directly beneath groove 24.

Into cavity segments 32 and 34 are inserted correspondingly shaped and sized first and second wedges 12 and 14. Both of the wedges may be of truncated conical shape as illustrated in FIGS. 1 and 3 or first wedge 12 may be of cylindrical shape, provided that it has one end that is wider than the other end and cavity segment 32 is appropriately shaped to receive the first wedge therein. If the wedges are truncated cones, then each wedge, of necessity, has a larger end and a smaller end. Larger end 21 of first wedge 12 may contain therein countersink 20 to accommodate rotatable bolthead 18 when all the elements of clamping device 100 are assembled together to accomplish the clamping of two bodies. If the first wedge is of a cylindrical shape having a larger end as described above, then the desired countersink may reside in the larger end of the cylindrical wedge.

Figure 6:
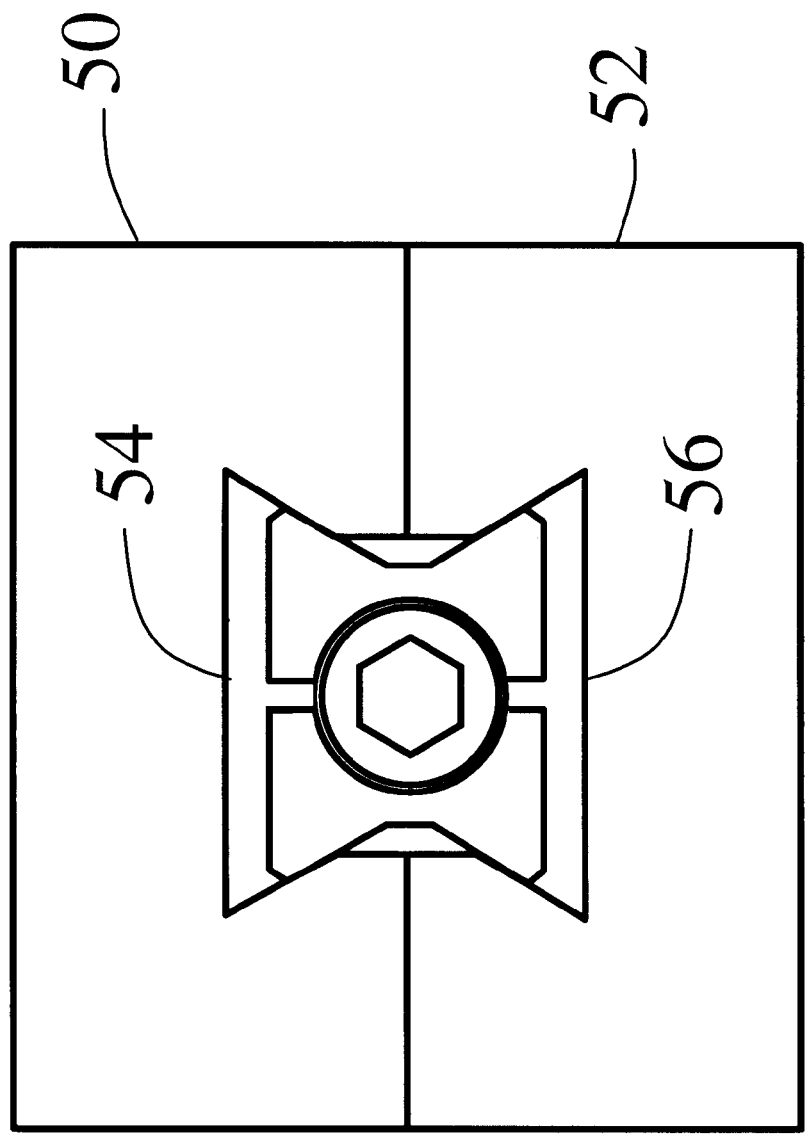
FIG. 6 is an end-view of the position of the clamping device with respect to the bodies being clamped together.
Figure 7:
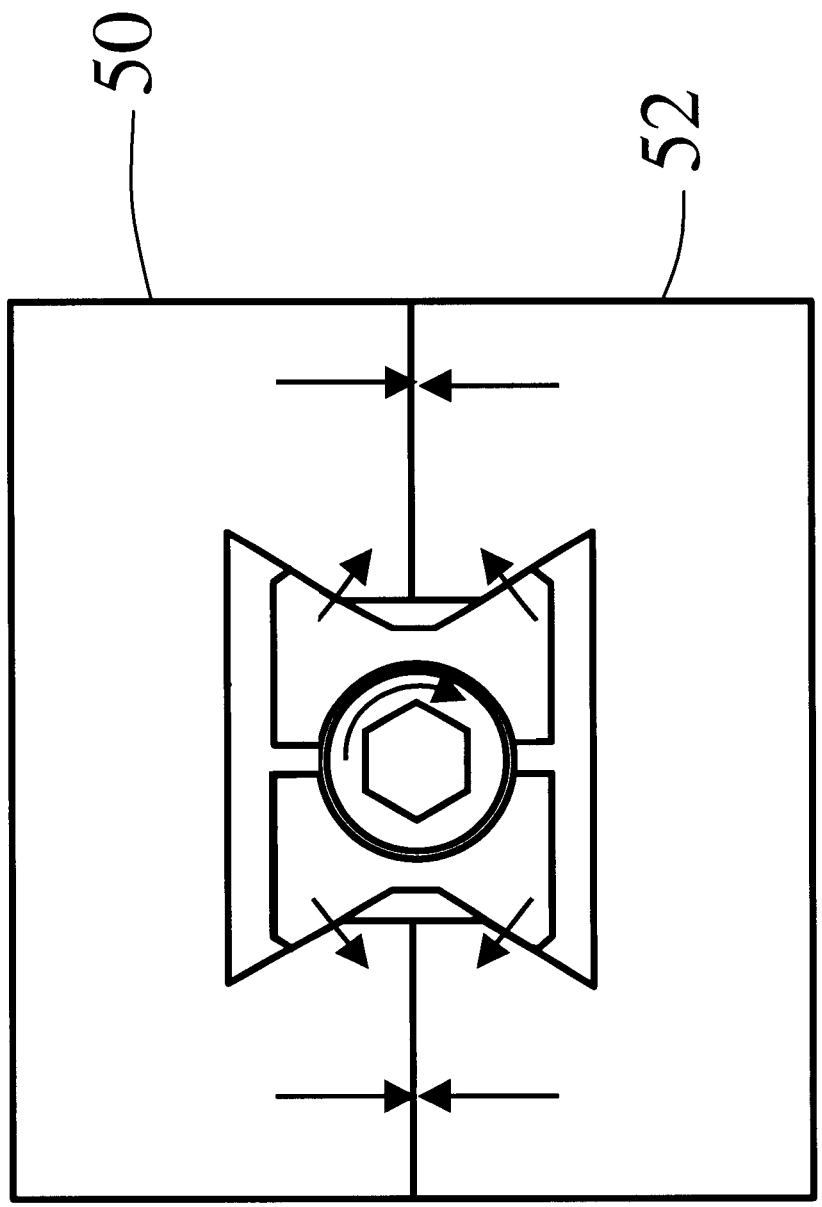
FIG. 7 illustrates the direction of clamping forces exerted by the device on the bodies being clamped together.
Figure 9:
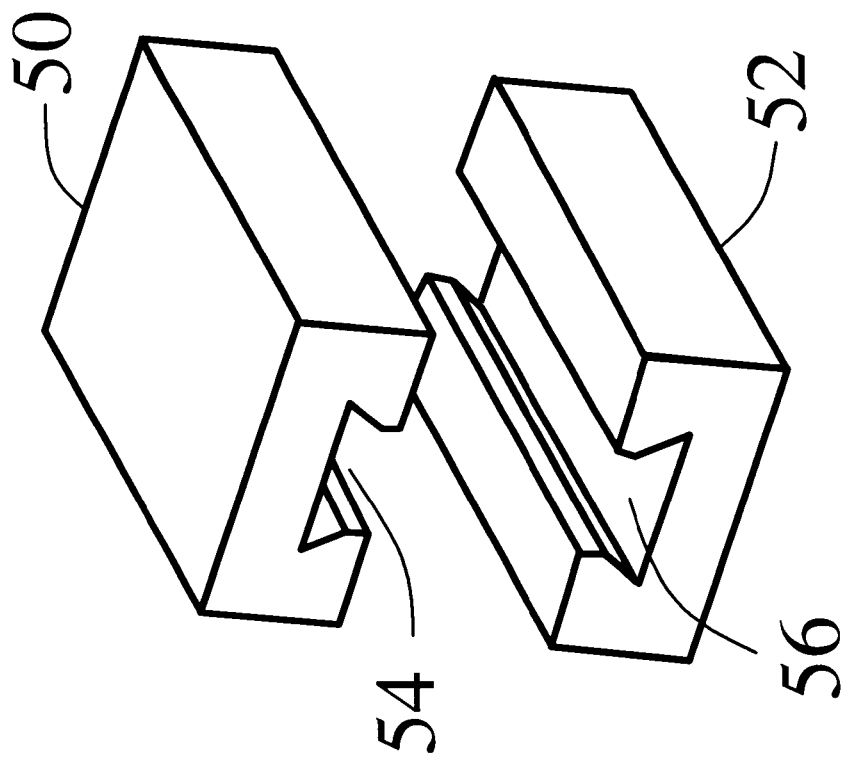
FIG. 9 illustrates the mortises.

In addition to the pre-selected exterior shape, FIG. 3 shows first conical wedge 12 having longitudinally therethrough smooth hole 38 that is wide enough to allow bolt 16 to be inserted through it freely. In contrast, second conical wedge 14 has longitudinally therein threaded hole 40, which, extending at least part of the way along the length of the second wedge, prevents bolt 16 from extruding from the second wedge at its larger end. Upon insertion of the wedges into the corresponding cavity segments, clamping device 100 is slid into mortises 54 and 56 that have been pre-formed into bodies 50 and 52, respectively. The mortises are illustrated in FIGS. 6 and 9. As can be seen in FIG. 6 that depicts an end-view of how clamping device 100 fits between bodies 50 and 52, these mortises are of corresponding configuration to accept and accommodate therein first and second tenons 101 and 103. Thereafter, in order to clamp bodies 50 and 52 together and form an airtight and flush seal between the mortised surfaces, threaded bolt 16 is inserted through the smooth hole in first wedge 12 and subsequently threaded, by rotating the bolthead, through the threaded hole in second wedge 14. The threading action of the bolt urges the two wedges toward flat center 36 of cavity 30. This, in turn, has the effect of expanding housing 10 causing the edges of the housing to flare out inside the mortises. The expansion motivates two opposing tenons 101 and 103 to exert forces in opposite directions but toward each other inside the mortises. FIG. 7 illustrates the direction of the force exertion and the resultant clamping of bodies 50 and 52 securely to each other.

Figure 4:
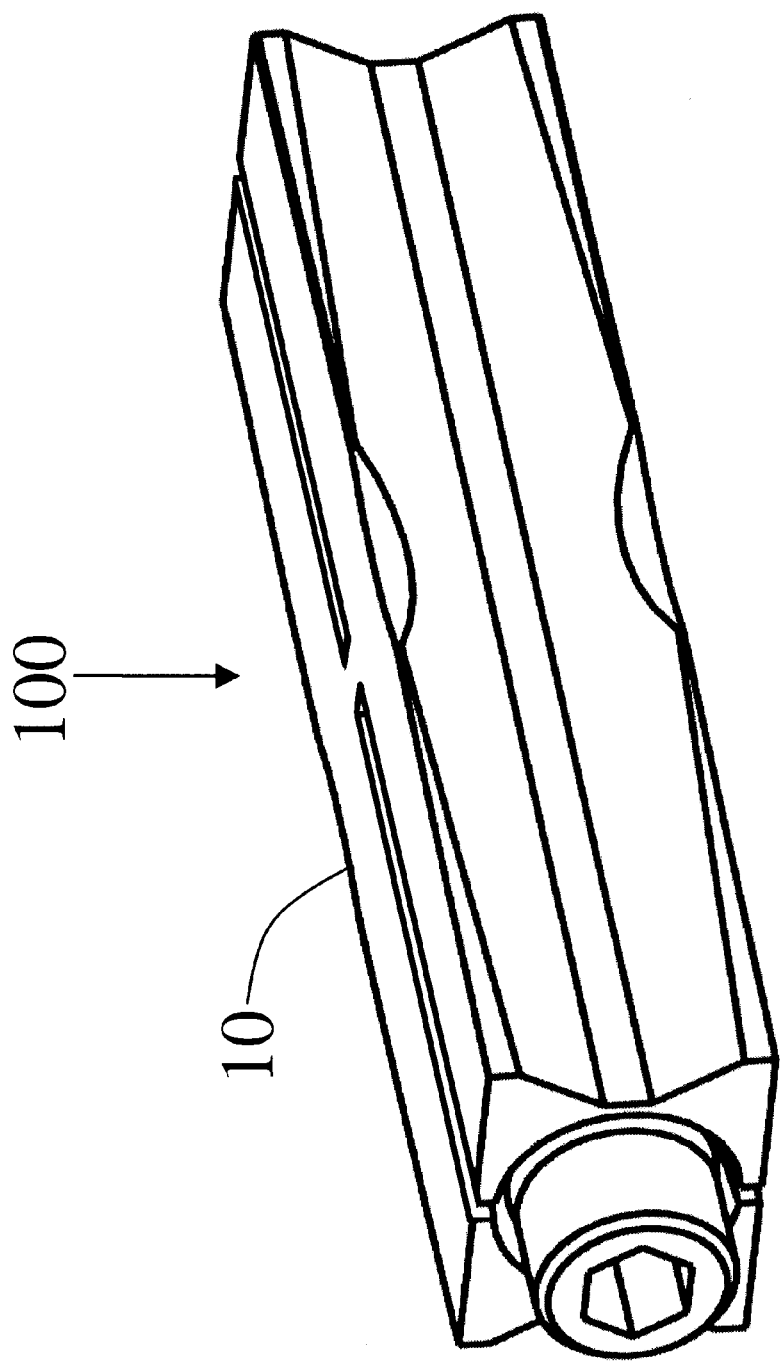
FIG. 4 shows all components, except the bolthead, completely fitted into the housing.
Figure 5:
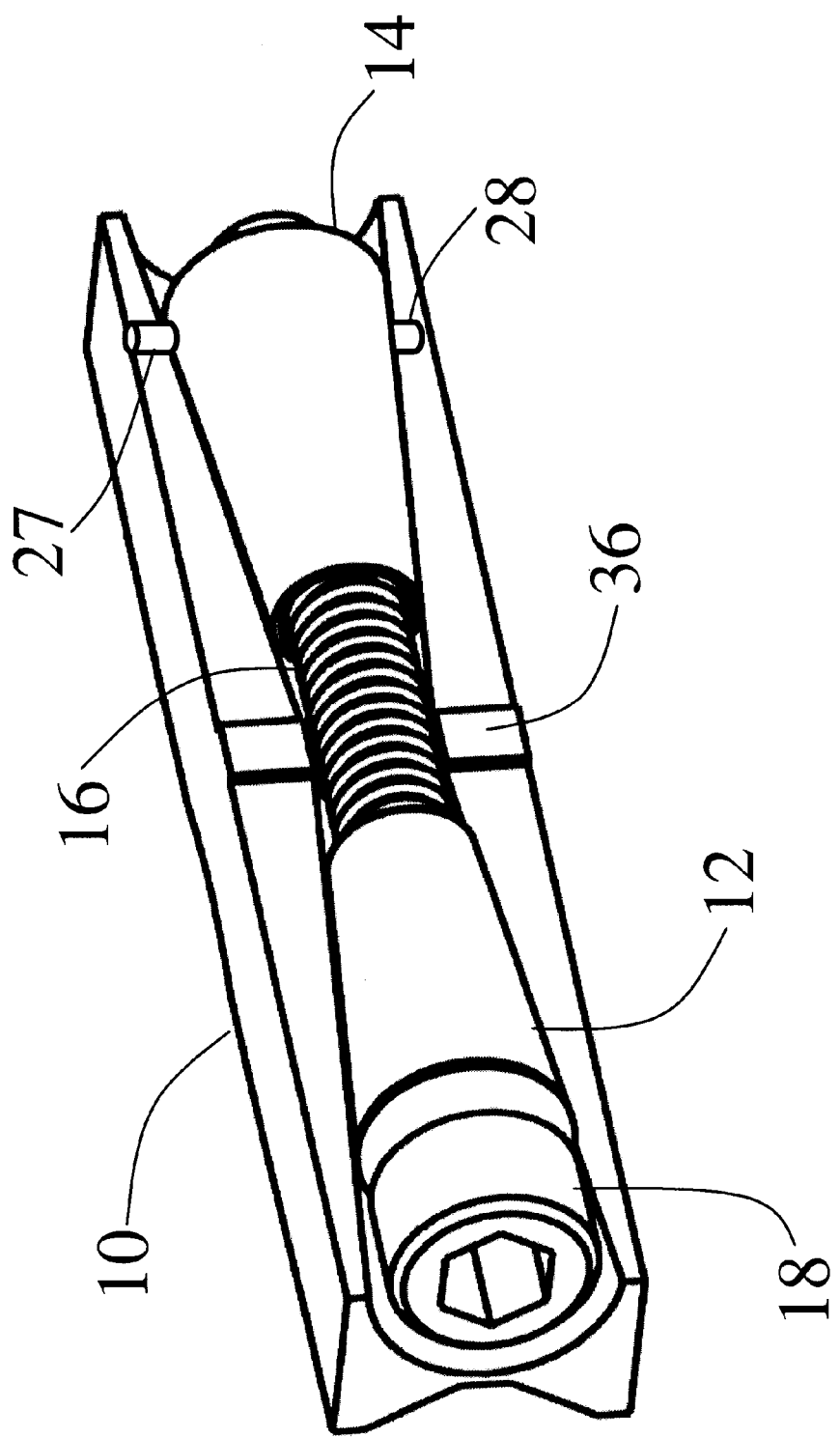
FIG. 5 is an interior view of FIG. 4.

Countersink 20 can be formed in larger end 21 of first wedge 12 to receive therein bolthead 18 upon completion of the clamping process. This completely nestles the bolthead and assures that no part of the expandable clamping device protrudes from the outer perimeter of the clamped bodies, as illustrated in FIG. 5. However, the function of the clamping device is not adversely affected by any residual protrusion of the bolthead, as may be seen in FIG. 4.

Pins 27 and 28 protruding in opposite directions from the side of second wedge 14 are adapted to slide into groove 24 in first tenon 101 and fourth groove 25 (unseen but necessarily implied in FIG. 1) in second tenon 103 while being short enough not to protrude outside the grooves. Thusly engaged within their respective grooves, the pins prevent the second wedge from spinning inside the cavity while bolt 16 is threaded through the second wedge during the clamping process.

The housing and other elements of clamping device 100 may be made of any suitable material such as steel, aluminum or other metals, depending on the strength requirement of the joint. Even plastic substances may be acceptable if the load-bearing requirements are not too strenuous.

Although a particular embodiment and form of this invention has been illustrated, it is apparent that various modifications and embodiments of the invention may be made by those skilled in the art without departing from the scope and spirit of the foregoing disclosure.

Figure 8:
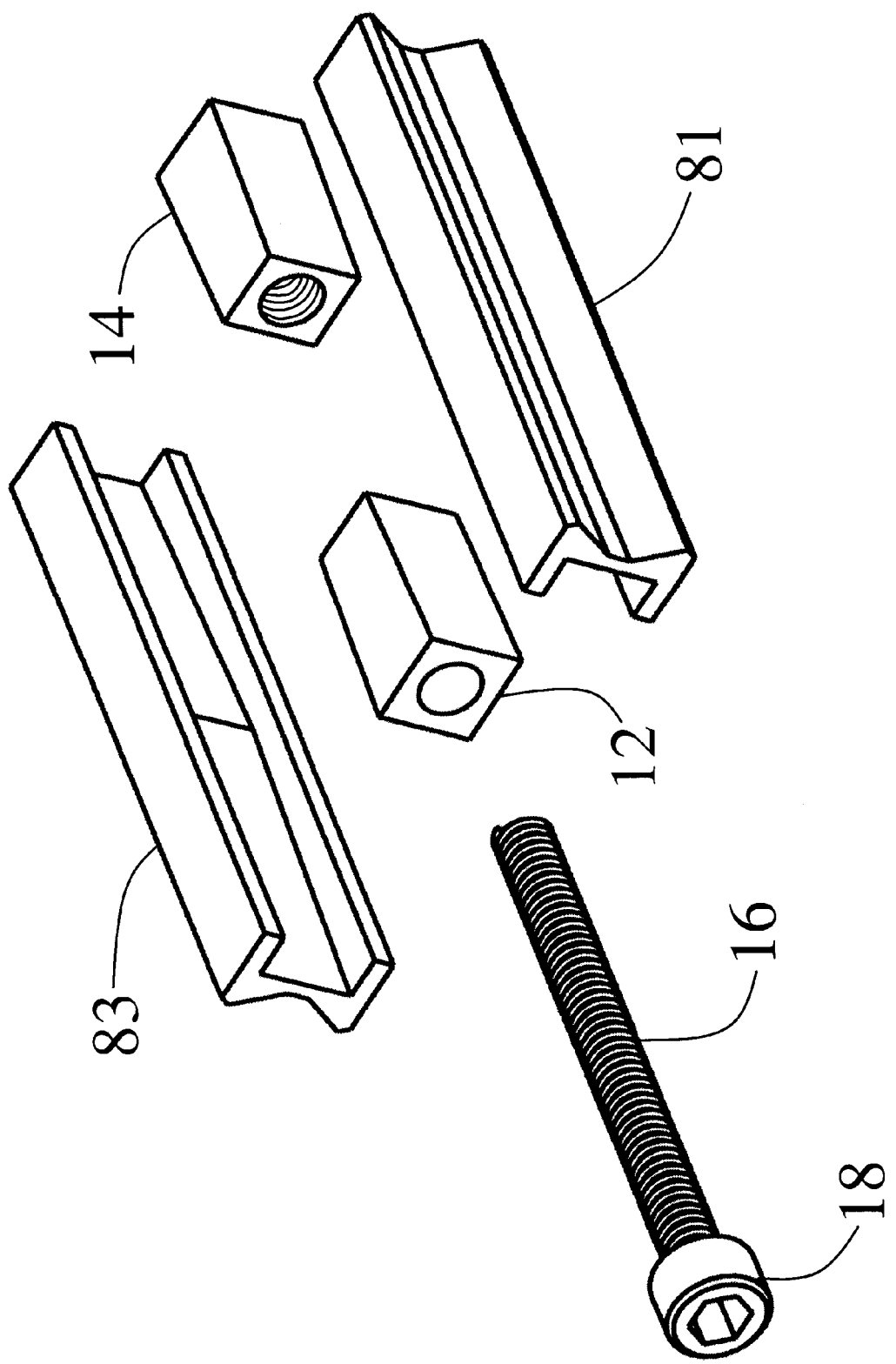
FIG. 8 shows the wedges having truncated pyramidal shape and housing as comprised of two clamshell halves, which together form truncated pyramidal shape cavity segments therebetween.

One such modification is to construct housing 10 from two identical clamshell halves as shown in FIG. 8. This makes fabrication of the housing easier. First clamshell 81 and second clamshell 83 jointly provide the tenons that fit into corresponding mortises in the clamping surfaces of the bodies that are to be clamped together. Another modification is to make the wedges truncated pyramids, Of course, this requires that cavity 30 inside housing 10 be comprised of segments that are of corresponding truncated pyramidal shape. Using pyramidal wedges eliminates the need for spin-preventing pins on the threaded second wedge.

Accordingly, the scope of the invention should be limited only by the claims appended hereto.

We claim:

1. A non-protrusive expandable clamping device for securely joining a first body and a second body together such that no part of said device protrudes from the joined bodies, the first body having a first side with a first mortise and the second body having a second side having a second mortise, said sides being suitable for being affixed to each other, thereby joining the two bodies together, said expandable clamping device being insertable between said sides parallel with said sides and comprising: a housing constructed to fit into said mortises, said housing having a cavity longitudinally therethrough, said cavity having opposing ends and a center; a first wedge having a smooth hole longitudinally therethrough; a second wedge having a threaded hole longitudinally partially therethrough, said wedges being adapted for insertion into said opposing ends of said cavity; and a bolt having a bolthead affixed thereto, said bolthead being suitable for rotating, said bolt being threaded for passing through said smooth hole and threading through said threaded hole to bring said wedges toward said center of said cavity and cause said housing, in response, to expand outwardly to exert clamping forces on said mortised sides, thereby clamping the first body and second body together.

2. A non-protrusive expandable clamping device for securely joining a first body and a second body together as described in claim 1, wherein said smooth hole is structured so as to allow said first wedge to move freely along the length of said bolt between said second wedge and said bolthead.

3. A non-protrusive expandable clamping device for securely joining a first body and a second body together such that no part of said device protrudes from the joined bodies, the first body having a first side with a first mortise and the second body having a second side with a second mortise, said sides being suitable for being affixed to each other, thereby joining the two bodies together, said expandable clamping device being insertable between said sides parallel with said sides and comprising: a housing constructed to fit into said mortises, said housing having a cavity longitudinally therethrough, said cavity having opposing ends and a center; a first wedge having a smooth hole longitudinally therethrough; a second wedge having a threaded hole longitudinally partially therethrough, said first and second wedges having identical exterior shape and being adapted for insertion into said opposing ends of said cavity; and a bolt having a bolthead affixed thereto, said bolthead being suitable for rotating, said bolt being threaded for passing through said smooth hole, said smooth hole being structured so as to allow said first wedge to move freely along the length of said bolt between said second wedge and said bolthead, said bolt further being threaded through said threaded hole to bring said wedges toward said center of said cavity and cause said housing to expand outwardly to exert clamping forces on said mortised sides, thereby clamping the first body and second body together.

4. An expandable clamping device as described in claim 3, wherein the larger end of said first wedge has a countersink therein to permit the complete nestling of said bolthead upon complete threading of said second wedge by said bolt, so as to leave no protrusion outside said housing when clamping of the bodies is achieved.

5. An expandable clamping device as described in claim 4, wherein said cavity in said housing comprises two segments that are mirror images of each other and are separated by said center.

6. An expandable clamping device as described in claim 5, wherein each of said cavity segments tapers down toward said center, said tapered cavity segments accommodating said tapered wedges inserted thereinto.

7. An expandable clamping device as described in claim 6, wherein said center is untapered.

8. An expandable clamping device as described in claim 7, wherein said housing is one integrated unit, said unit comprising a first tenon and a second tenon suitable for insertion into said first and second mortises, respectively.

9. An expandable clamping device as described in claim 8, wherein said cavity within said housing comprises a pair of mirror-image, truncated conical segments and a flat center located between said conical segments.

10. An expandable clamping device as described in claim 9, wherein said wedges bear a truncated conical exterior shape corresponding with said truncated conical cavity segments.

11. An expandable clamping device as described in claim 10, wherein said second conical wedge has a means thereon for preventing said wedge from spinning within said cavity while said bolt is being threaded through said wedge.

12. An expandable clamping device as described in claim 11, wherein said preventing means comprises a first, a second, a third and a fourth grooves, said first and second grooves running through the middle of said first tenon and being mirror images of each other with respect to said center and said third and fourth grooves running through the middle of said second tenon and being mirror images of each other with respect to said center; and a pair of pins protruding from the surface of said second wedge, said pins pointing in opposite directions and being suitable for traveling the length of said grooves and stoppable by said center.

13. An expandable clamping device as described in claim 12, wherein said pins do not protrude outside said housing while traveling the length of said grooves.

14. An expandable clamping device for securely joining a first body and a second body together, the first body having a first side with a first mortise and the second body having a second side having a second mortise, said sides being suitable for being affixed to each other, thereby joining the two bodies together, said expandable clamping device being insertable between said sides parallel with said sides and comprising: a housing constructed to fit into said mortises, said housing having a cavity longitudinally therethrough, said cavity having opposing ends and a center; a first wedge having a smooth hole longitudinally therethrough; a second wedge having a threaded hole longitudinally partially therethrough, said wedges being adapted for insertion into said opposing ends of said cavity; and a bolt having a bolthead affixed thereto, said bolthead being suitable for rotating, said bolt being threaded for passing through said smooth hole and threading through said threaded hole to cause said housing, in response, to expand outwardly to exert clamping forces on said mortised sides, thereby clamping the first body and second body together.

* * * * *